(12) United States Patent
Sato et al.

(10) Patent No.: US 10,495,844 B2
(45) Date of Patent: Dec. 3, 2019

(54) LENS DRIVE DEVICE, CAMERA MODULE, AND CAMERA-MOUNTING DEVICE

(71) Applicants: Yoshiaki Sato, Tokyo (JP); Tomohiko Osaka, Tokyo (JP); Noriyuki Kobayashi, Tokyo (JP); Toshihiko Honma, Tokyo (JP)

(72) Inventors: Yoshiaki Sato, Tokyo (JP); Tomohiko Osaka, Tokyo (JP); Noriyuki Kobayashi, Tokyo (JP); Toshihiko Honma, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 53 days.

(21) Appl. No.: 15/539,379

(22) PCT Filed: Dec. 24, 2015

(86) PCT No.: PCT/JP2015/006424
§ 371 (c)(1),
(2) Date: Jun. 23, 2017

(87) PCT Pub. No.: WO2016/103698
PCT Pub. Date: Jun. 30, 2016

(65) Prior Publication Data

US 2017/0363839 A1 Dec. 21, 2017

(30) Foreign Application Priority Data

Dec. 26, 2014 (JP) .................................. 2014-265983

(51) Int. Cl.
*G02B 7/10* (2006.01)
*H04N 5/232* (2006.01)
(Continued)

(52) U.S. Cl.
CPC ............ *G02B 7/102* (2013.01); *G01J 1/0414* (2013.01); *G02B 7/09* (2013.01); *G02B 7/28* (2013.01);
(Continued)

(58) Field of Classification Search
CPC ... G02B 7/04; G02B 7/09; G02B 7/28; G03B 5/04
(Continued)

(56) References Cited

U.S. PATENT DOCUMENTS

2008/0265136 A1* 10/2008 Tanaka ............... G01D 5/34746
250/206.1
2009/0177436 A1 7/2009 Yoshida et al.
(Continued)

FOREIGN PATENT DOCUMENTS

CN 102645815 A 8/2012
JP 2006-227274 A 8/2006
(Continued)

OTHER PUBLICATIONS

International Search Report from International Application No. PCT/JP2015/006424 dated Mar. 15, 2016.

Primary Examiner — Kevin K Pyo
(74) Attorney, Agent, or Firm — Brundidge & Stanger, P.C.

(57) ABSTRACT

Provided is a lens drive device that, using drive force from a voice coil motor, automatically carries out focusing by moving an autofocus movable unit with respect to an autofocus fixed unit in the direction of an optical axis. The lens drive unit is provided with a position detection unit that is disposed with an intervening space on the image formation side of the autofocus movable unit in the direction of the optical axis and that is for emitting light toward the autofocus movable unit, receiving reflected light that has been
(Continued)

reflected by the autofocus movable unit, and detecting the position of the autofocus movable unit in the direction of the optical axis on the basis of the received light intensity. Part of the member displaced along with the autofocus movable unit functions as a reflective plate for reflecting light emitted from the position detection unit.

6 Claims, 8 Drawing Sheets

(51) Int. Cl.
*G01J 1/04* (2006.01)
*G02B 7/09* (2006.01)
*G02B 7/28* (2006.01)
*H04N 5/225* (2006.01)
*G02B 26/08* (2006.01)

(52) U.S. Cl.
CPC ......... *G02B 26/085* (2013.01); *H04N 5/2253* (2013.01); *H04N 5/2256* (2013.01); *H04N 5/232* (2013.01)

(58) Field of Classification Search
USPC .................................. 250/201.2, 201.4, 216
See application file for complete search history.

(56) References Cited

U.S. PATENT DOCUMENTS

| | | |
|---|---|---|
| 2012/0154614 A1 | 6/2012 | Moriya et al. |
| 2013/0050828 A1 | 2/2013 | Sato et al. |
| 2018/0239217 A1* | 8/2018 | Konuma .................. G02B 7/04 |

FOREIGN PATENT DOCUMENTS

| | | |
|---|---|---|
| JP | 2006-337809 A | 12/2006 |
| JP | 2010-160404 A | 7/2010 |
| JP | 2012-189613 A | 10/2012 |
| JP | 2013-210550 A | 10/2013 |

* cited by examiner

LENS DRIVE DEVICE, CAMERA MODULE, AND CAMERA-MOUNTING DEVICE

TECHNICAL FIELD

The present invention relates to an auto-focusing lens driving device, a camera module having an auto-focusing function, and a camera mounting device.

BACKGROUND ART

In general, a small-sized camera module is mounted in mobile terminals such as a smartphone. In such a camera module, a lens driving device having an auto-focusing function (hereinafter referred to as "AF (Auto Focus) function") of automatically performing focusing at the time of capturing a subject is applied.

An auto-focusing lens driving device includes an auto-focusing driving part (hereinafter referred to as "AF driving part") for moving the lens part in the light axis direction. The AF driving part includes, for example, an auto-focusing coil part (hereinafter referred to as "AF coil part") disposed around the lens part, and an auto-focusing magnet part (hereinafter referred to as "AF magnet part") disposed separately from the AF coil part in the radial direction. An auto-focusing movable part (hereinafter referred to as "AF movable part") including the lens part and the AF coil part is moved with respect to an auto-focusing fixing part (hereinafter referred to as "AF fixing part") including the AF magnet part in the light axis direction by use of a driving force of a voice coil motor composed of the AF coil part and the AF magnet part, and thus focusing is automatically performed.

Conventionally, for example, a method of adjusting the focusing position by analyzing multiple pieces of image information acquired with the image sensor while moving the lens part, and by performing contrast evaluation has been employed. With such a method, however, focusing takes time, and the time period until capturing is long.

In view of this, in recent years, a method (so-called closed loop control system) has been increasingly used in which the lens position is detected at all times with a position detection device mounted in a camera module, and the operation of an AF driving part (voice coil motor) is controlled based on the detection result. The method of detecting the lens position includes methods of detecting the lens position based on variation in magnetic field by use of a Hall device, and methods of detecting the lens position based on variation in light incident on a light reception part by use of an optical sensor (for example, a reflection-type photo reflector) (for example, PTL 1).

A reflection-type photo reflector is an optical sensor in which a light emission part and a light reception part are included in one semiconductor package, light (for example, infrared ray) emitted from the light emission part is reflected by a detection object, and the position of the detection object is detected based on the intensity of reflection light incident on the light reception part. In the case where the position of an AF movable part with respect to an AF fixing part is detected by utilizing the above-mentioned reflection-type photo reflector, it is necessary to mount the reflection-type photo reflector in the AF fixing part, and dispose a reflection plate (for example, an aluminum mirror) in the AF movable part.

CITATION LIST

Patent Literature

PTL 1
Japanese Patent Application Laid-Open No. 2012-189613

SUMMARY OF INVENTION

Technical Problem

In the case where a reflection-type photo reflector is utilized for detecting the lens position, however, a reflection plate, which is not included in the components of the AF movable part, is bonded to the AF movable part, and in addition, in order to stabilize the operation of the AF movable part, a similar member for weight balancing is required to be disposed on the side opposite to the portion on which the reflection plate is attached. Consequently, the component cost of the lens driving device is increased, and assembly work is complicated. Furthermore, increase in weight of the AF movable part may possibly result in reduction in response sensitivity of the lens driving device. Increase in weight of the AF movable part may be suppressed by reducing the thickness of the reflection plate. When the thickness of the reflection plate is reduced, however, the material strength is reduced, and consequently workability and handleability are disadvantageously sacrificed.

An object of the present invention is to provide a lens driving device that is useful for the case where automatic focusing is performed by a closed loop control system using a reflection-type photo reflector, and a camera module and a camera mounting device including the lens driving device.

Solution to Problem

A lens driving device according to an embodiment of the present invention includes: a lens driving device including an auto-focusing coil part disposed at a periphery of a lens part, and an auto-focusing magnet part disposed separately from the auto-focusing coil part in a radial direction, the lens driving device being configured to perform automatic focusing by moving, with respect to an auto focus fixing part including one of the auto-focusing coil part and the auto-focusing magnet part, an auto focus movable part including the other of the auto-focusing coil part and the auto-focusing magnet part in a light axis direction by use of a driving force of a voice coil motor composed of the auto-focusing coil part and the auto-focusing magnet part; and a position detection part disposed separately from the auto focus movable part on an imaging side in the light axis direction, the position detection part being configured to emit light toward the auto focus movable part and receive light reflected by the auto focus movable part to detect a position of the auto focus movable part in the light axis direction based on an intensity of received light. A part of a member that is displaced together with the auto focus movable part functions as a reflection plate configured to reflect light emitted from the position detection part.

A camera module according to an embodiment of the present invention includes: the above-mentioned lens driving device; a lens part mounted to the auto focus movable part; and an image capturing part configured to capture a subject image imaged with the lens part.

A camera mounting device according to an embodiment of the present invention is an information apparatus or a transport apparatus, the camera mounting device includes the above-mentioned camera module.

Advantageous Effects of Invention

According to the present invention, a part of a member that is displaced together with the AF movable part is utilized as the reflection plate, and thus the reflection-type photo reflector can be mounted without increasing the component cost or complicating the assembly work. Accordingly, the present invention is useful for the case where automatic focusing is performed with a closed loop control system using the reflection-type photo reflector.

DESCRIPTION OF EMBODIMENT

Figure 1A:
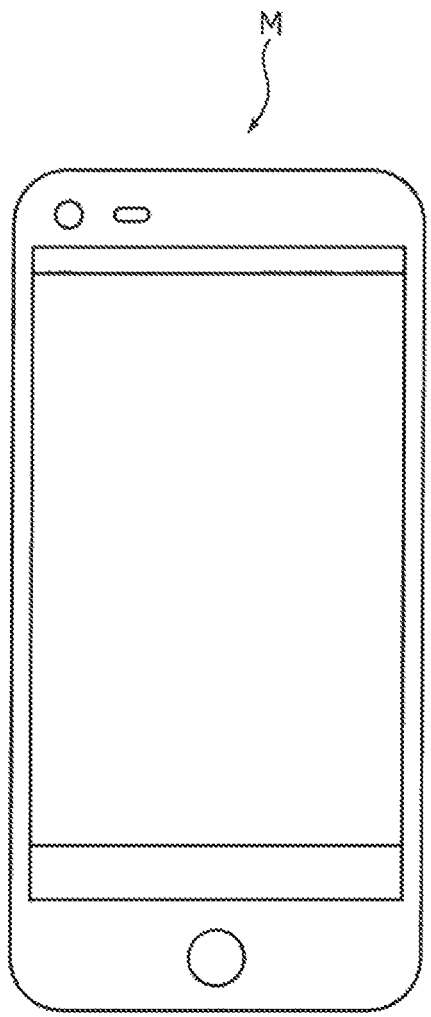
FIGS. 1A and 1B illustrate a smartphone in which a camera module according to an embodiment of the present invention is mounted.
Figure 1B:
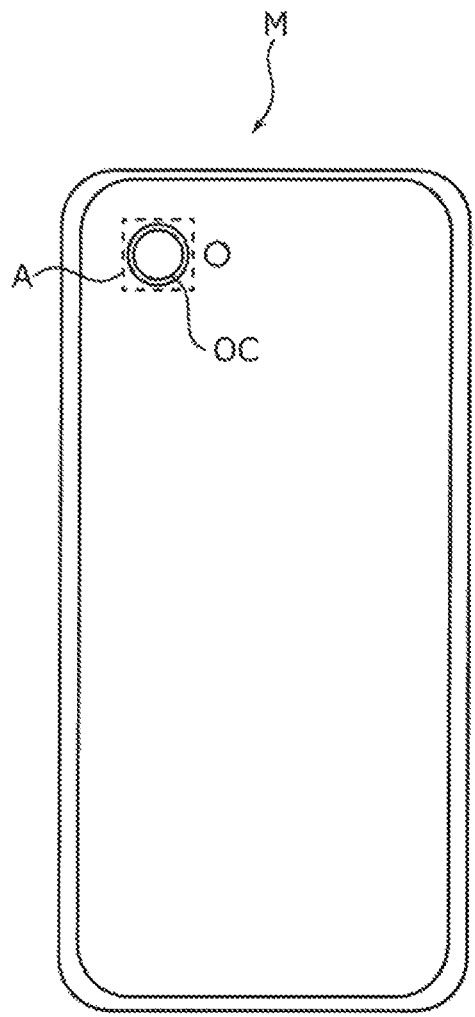

In the following, an embodiment of the present invention is described in detail with reference to the drawings. FIGS. 1A and 1B illustrate smartphone M (camera mounting device) in which camera module A according to the embodiment of the present invention is mounted. FIG. 1A is a front view of smartphone M, and FIG. 1B is a rear view of smartphone M.

For example, smartphone M is provided with camera module A as a back side camera OC. Camera module A has an auto focus function, and performs automatic focusing at the time of capturing a subject.

Figure 2:
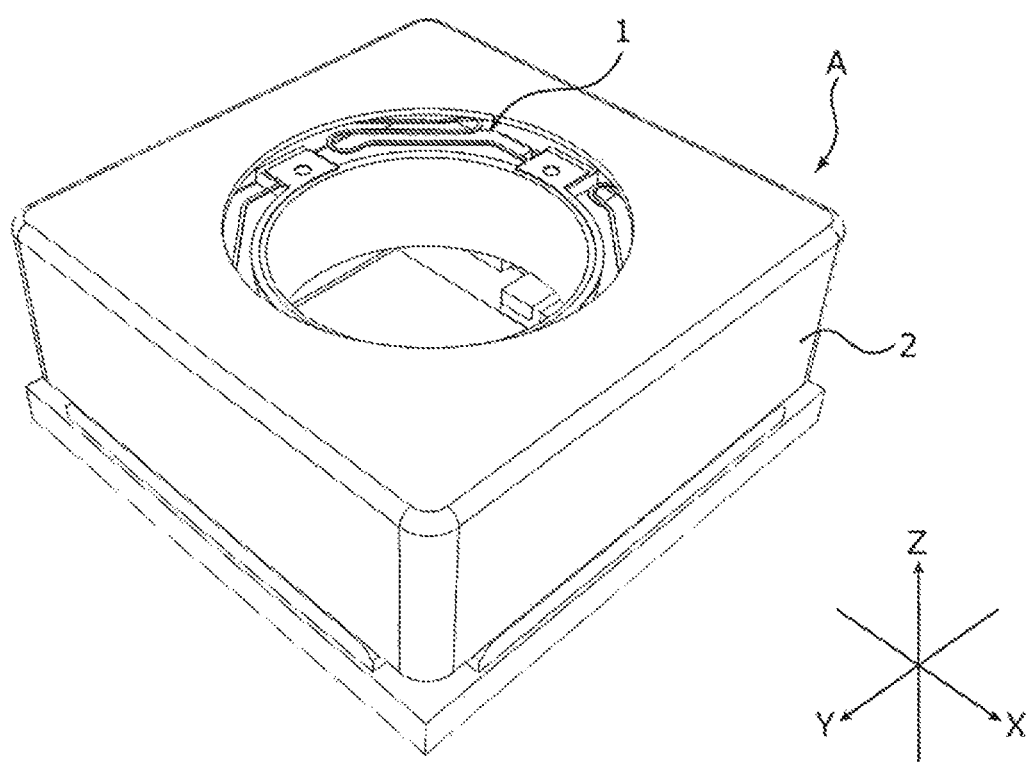
FIG. 2 is a perspective view of an external appearance of the camera module.
Figure 3:
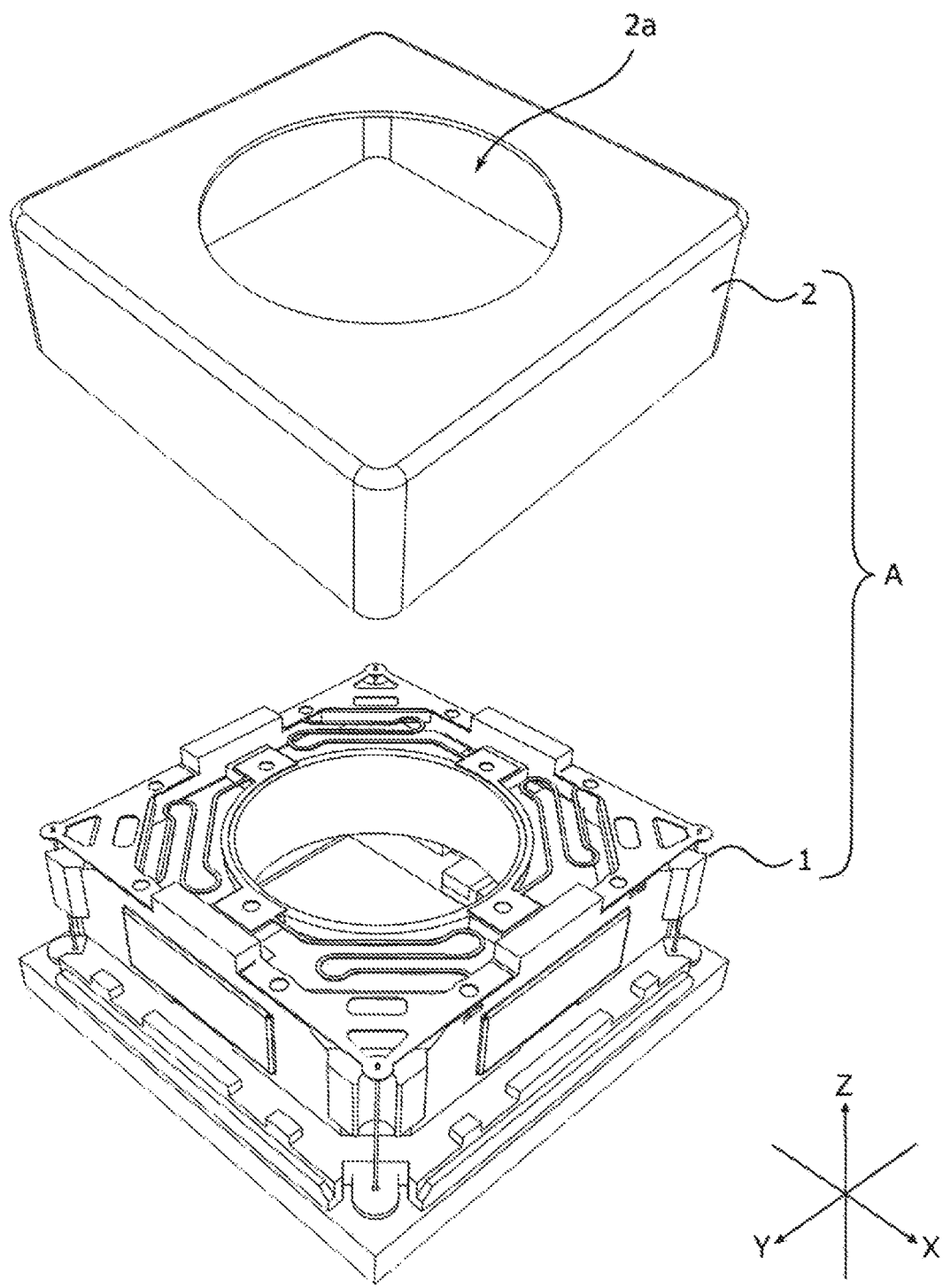
FIG. 3 is an exploded perspective view of the camera module.

FIG. 2 is a perspective view of an external appearance of camera module A. FIG. 3 is an exploded perspective view of camera module A. As illustrated in FIG. 2 and FIG. 3, descriptions will be made with an orthogonal coordinate system (X, Y, Z) in the present embodiment. Also in the drawings described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the light axis direction, the upper side in the drawing is the light reception side in the light axis direction (also referred to as "macro position side"), and the lower side is the imaging side in the light axis direction (also referred to as "infinity position side").

Camera module A includes a lens part in which a lens is housed in a lens barrel having a cylindrical shape (not illustrated), auto-focusing lens driving device 1, shield cover 2 that covers the entirety, and the like.

As viewed in the light axis direction, shield cover 2 is a capped square cylindrical body having a square shape in plan view. Circular opening 2a is formed in the top surface of shield cover 2. A lens part (not illustrated) is exposed to the outside through opening 2a. Shield cover 2 is fixed to base member 21 (see FIG. 6) of lens driving device 1. Through a terminal metal fitting of base member 21 (not illustrated), shield cover 2 is electrically connected with image sensor substrate 22 (see FIG. 6), and grounded. With shield cover 2, it is possible to block EMC noise.

Figure 4:
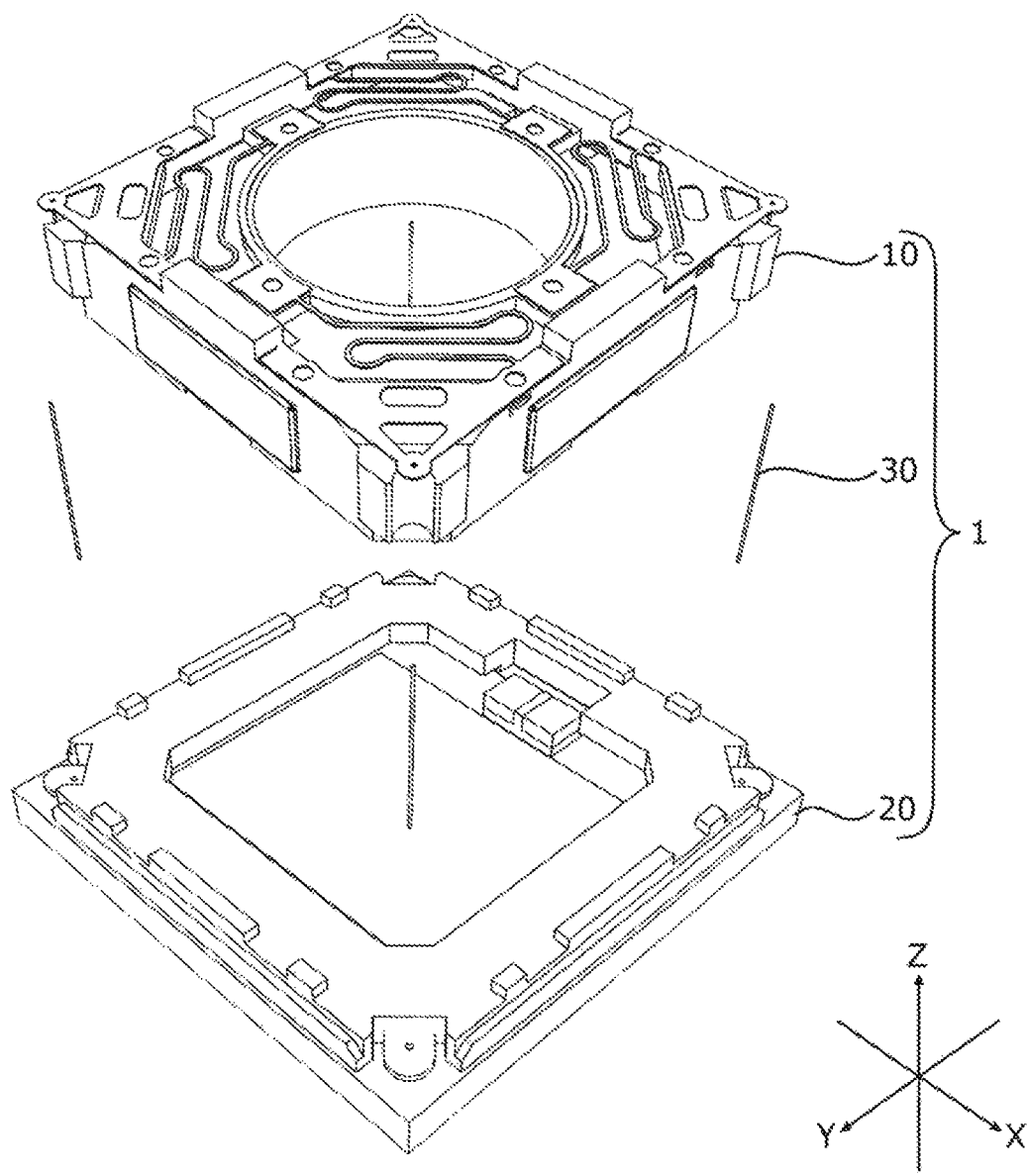
FIG. 4 is an exploded perspective view of a lens driving device.

FIG. 4 is an exploded perspective view of lens driving device 1. As illustrated in FIG. 4, lens driving device 1 includes AF driving part of 10, base part 20, supporting member 30 and the like.

AF driving part 10 is disposed on the light reception side in the light axis direction relative to base part 20, and coupled with base part 20 by supporting member 30. To be more specific, supporting member 30 is composed of four suspension wires extending along the Z direction (hereinafter referred to as "suspension wires 30"). One end (upper end) of suspension wire 30 is fixed to AF driving part 10 (upper elastic supporting part 13), and the other end (lower end) thereof is fixed to base part 20 (terminal metal fitting 211, see FIG. 6). Two of four suspension wires 30 are used as power feeding paths for AF coil part 112 (see FIG. 5). It is to be noted that the number of suspension wires 30 is not limited, and five or more suspension wires 30 may be provided.

Figure 5:
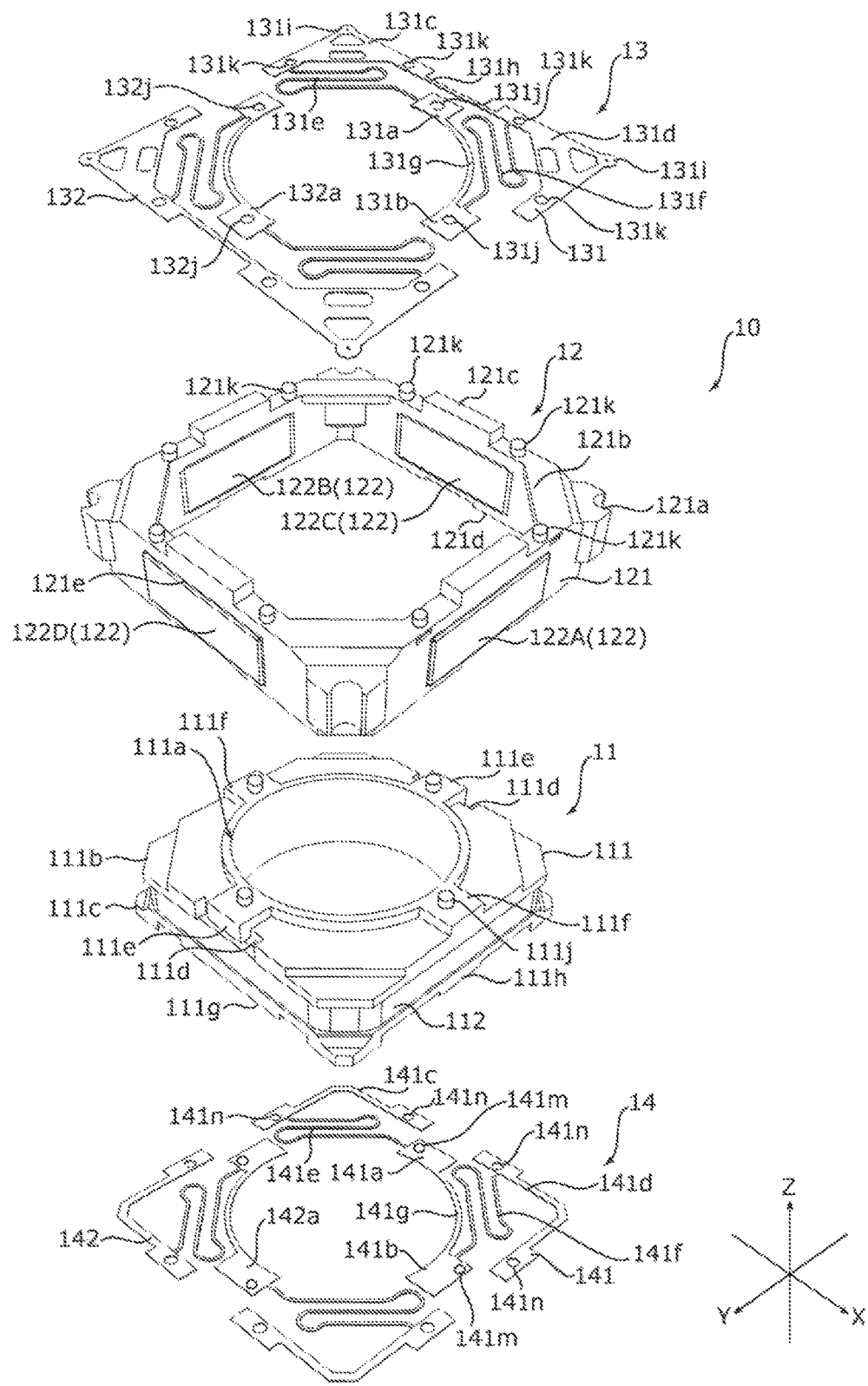
FIG. 5 is an exploded perspective view of an AF driving part.

FIG. 5 is an exploded perspective view of AF driving part 10. As illustrated in FIG. 5, AF driving part 10 includes AF movable part 11, AF fixing part 12, upper elastic supporting part 13, lower elastic supporting part 14 and the like. AF movable part 11 is disposed on the radially inside relative to AF fixing part 12 and is separated from AF fixing part 12. AF movable part 11 is coupled with AF fixing part 12 by upper elastic supporting part 13 and lower elastic supporting part 14.

AF movable part 11 includes a coil part serving as a component of an AF voice coil motor, and moves in the light axis direction at the time of focusing. AF fixing part 12 includes a magnet part serving as a component of the AF voice coil motor. That is, AF driving part 10 of lens driving device 1 is of a moving coil type.

AF movable part 11 includes lens holder 111, and AF coil part 112.

Lens holder 111 is a member having a quadrangular cylindrical shape, and a lens part (not illustrated) is fixed to lens housing part 111a having a cylindrical shape by bonding or screwing. Lens holder 111 includes upper flange part 111b and lower flange part 111c on the peripheral surface of lens housing part 111a. AF coil part 112 is wound at a part (hereinafter referred to as "coil winding part") sandwiched between upper flange part 111b and lower flange part 111c.

The four corners of upper flange part 111b are recessed from the peripheral reference surface (top surface). Upper flange part 111b includes cutout part 111d at an approximate center of the periphery extending in the X direction. Upper flange part 111b includes, at an upper portion of the outer periphery of lens housing part 111a, two protruding parts 111e which are opposite to each other in the Y direction. In addition, upper flange part 111b includes, at an upper portion of the outer periphery of lens housing part 111a, two protruding parts 111f which are opposite to each other in the X direction. Protruding parts 111e and 111f serve as upper spring fixing parts (hereinafter referred to as "upper spring fixing part 111e" and "upper spring fixing part 111f") for fixing upper elastic supporting part 13. In addition, each of the outer end portions of a pair of upper spring fixing parts 111e is bend downward (to the imaging side in the light axis direction), and is located at cutout part 111d.

The four corners of lower flange part 111c are recessed from the peripheral reference surface (coil contacting surface). Lower flange part 111c includes, at a lower portion of the outer periphery of lens housing part 111a, two protruding parts 111g which are opposite to each other in the Y direction. In addition, lower flange part 111c includes, at a lower portion of the outer periphery of lens housing part 111a, two protruding parts 111h which are opposite to each other in the X direction. The bottom surface of protruding part 111h and the bottom surface of the four corners of lower flange part 111c are flush with each other. Protruding parts 111g and 111h serve as lower spring fixing parts (hereinafter referred to as "lower spring fixing part 111g" and "lower spring fixing part 111h") for fixing lower elastic supporting part 14.

AF coil part 112 is an air-core coil that is energized at the time of focusing, and is wound around the outer peripheral surface of a coil winding part of lens holder 111. The both ends of AF coil part 112 are tied to upper spring fixing parts 111e of lens holder 111.

AF fixing part 12 includes magnet holder 121, and magnet part 122. Magnet holder 121 has a quadrangular cylindrical shape which is square in plan view. Magnet holder 121 includes, at the four corners, arc groove parts 121a recessed inward in the radial direction. Suspension wire 30 is disposed at arc groove part 121a.

Magnet holder 121 includes, at the four corners of the upper portion, upper spring fixing parts 121b that fix upper elastic supporting part 13. Upper spring fixing parts 121b overhang inward in the radial direction. Upper spring fixing parts 121b make contact with the four corners of lens holder 111 when AF movable part 11 moves to the light reception side in the light axis direction, and thus restrict the movement of AF movable part 11 to the light reception side in the light axis direction. Magnet holder 121 includes, at an approximate center of each side of the upper portion, protruding part 121c that protrudes upward (the light reception side in the light axis direction).

Lower elastic supporting part 14 is fixed to bottom surface 121d of magnet holder 121 (hereinafter referred to as "lower spring fixing part 121d"). Magnet holder 121 includes, at the four side walls, openings 121e each having a quadrangular shape. Magnet part 122 is housed in the openings (hereinafter referred to as "magnet housing parts 121e").

Magnet part 122 is composed of four cuboid permanent magnets 122A to 122D. Permanent magnets 122A to 122D are respectively disposed in magnet housing parts 121e of magnet holder 121. Permanent magnets 122A and 122B are disposed to face each other in the X direction, and permanent magnets 122C and 122D are disposed to face each other in the X direction. Permanent magnets 122A to 122D are magnetized such that a traversing magnetic field in the radial direction is formed at AF coil part 112. For example, permanent magnets 122A to 122D are magnetized such that the inner periphery side and the outer periphery side thereof are set to N pole and S pole, respectively. The AF voice coil motor is composed of magnet part 122 and AF coil part 112.

Upper elastic supporting part 13 is a leaf spring formed of beryllium copper, nickel copper, stainless-steel or the like, for example, and has a square shape as a whole in plan view. Upper elastic supporting part 13 elastically supports AF movable part 11 with respect to AF fixing part 12. Here, upper elastic supporting part 13 is composed of point symmetrical two upper leaf springs 131 and 132. Upper leaf springs 131 and 132 are shaped by punching and cutting a single sheet metal, for example. Upper leaf springs 131 and 132 have similar configurations, and therefore description of upper leaf spring 132 will be omitted.

Upper leaf spring 131 includes lens holder fixing parts 131a and 131b, magnet holder fixing parts 131c and 131d, and arm parts 131e and 131f. Lens holder fixing parts 131a and 131b are coupled with each other with internal edge 131g extending along the top surface of lens housing part 111a of lens holder 111. Magnet holder fixing parts 131c and 131d are coupled with each other by external edge 131h extending along protruding part 121c of magnet holder 121.

Lens holder fixing parts 131a and 131b have shapes corresponding to upper spring fixing parts 111e and 111f of lens holder 111. When positioning bosses 111j of lens holder 111 are fitted into fixing holes 131j of lens holder fixing parts 131a and 131b, upper leaf spring 131 is positioned to lens holder 111, and fixed by applying an adhesive agent to positioning bosses 111j or by thermally caulking positioning bosses 111j. One lens holder fixing part 131a is fixed to upper spring fixing part 111e of lens holder 111, and electrically connected with AF coil part 112 tied to upper spring fixing part 111e.

Magnet holder fixing parts 131c and 131d have shapes corresponding to upper spring fixing parts 121b of magnet holder 121. When positioning bosses 121k of magnet holder 121 are fitted into fixing holes 131k of magnet holder fixing parts 131c and 131d, upper leaf spring 131 is positioned to magnet holder 121, and fixed by applying an adhesive agent to positioning bosses 121k or by thermally caulking positioning bosses 121k. In addition, vertex parts 131i of magnet holder fixing parts 131c and 131d serve as wire connecting parts where suspension wires 30 are connected (hereinafter referred to as "wire connecting parts 131i").

Wire connecting part 131i is located on the light reception side in the light axis direction of arc groove part 121a of magnet holder 121. In the state where upper leaf spring 131 is attached to magnet holder 121, a gap is formed between wire connecting part 131i and arc groove part 121a. A damper is disposed in this gap. In addition, wire connecting part 131i has a shape which is easily elastically deformed. Deflection of wire connecting part 131i and suspension wire 30 absorbs a drop impact. Thus, plastic deformation and rupture of suspension wire 30 with a drop impact can be effectively prevented.

Arm parts 131e and 131f couple lens holder fixing part 131a and magnet holder fixing part 131c, and lens holder fixing part 131b and magnet holder fixing part 131d, respectively. Each of arm parts 131e and 131f has a zigzag shape, and is elastically deformed when AF movable part 11 moves.

The configuration of lower elastic supporting part 14 is substantially similar to that of upper elastic supporting part 13. That is, lower elastic supporting part 14 is a leaf spring formed of beryllium copper, nickel copper, stainless-steel or the like, for example, and has a square shape as a whole in plan view. Lower elastic supporting part 14 elastically supports AF movable part 11 with respect to AF fixing part 12. Here, lower elastic supporting part 14 is composed of point symmetrical two lower leaf springs 141 and 142. Lower leaf springs 141 and 142 are shaped by punching and cutting a single sheet metal. Since configurations of lower leaf springs 141 and 142 are similar to each other, the description of lower leaf spring 142 will be omitted.

Lower leaf spring 141 includes lens holder fixing parts 141a and 141b, magnet holder fixing parts 141c and 141d, and arm parts 141e and 141f. Lens holder fixing parts 141a and 141b are coupled with each other with internal edge 141g extending along the bottom surface of lens housing part 111a of lens holder 111.

Lens holder fixing parts 141a and 141b have shapes corresponding to lower spring fixing part 111g and 111h of lens holder 111. When the positioning bosses (not illustrated) of lens holder 111 are fitted into fixing holes 141m of lens holder fixing parts 141a and 141b, lower leaf spring 141 is positioned to lens holder 111, and fixed by applying an adhesive agent to the positioning boss or by thermally caulking the positioning boss. When AF movable part 11 moves in the light axis direction, lens holder fixing parts 141a and 141b are displaced together with AF movable part 11.

Figure 6:
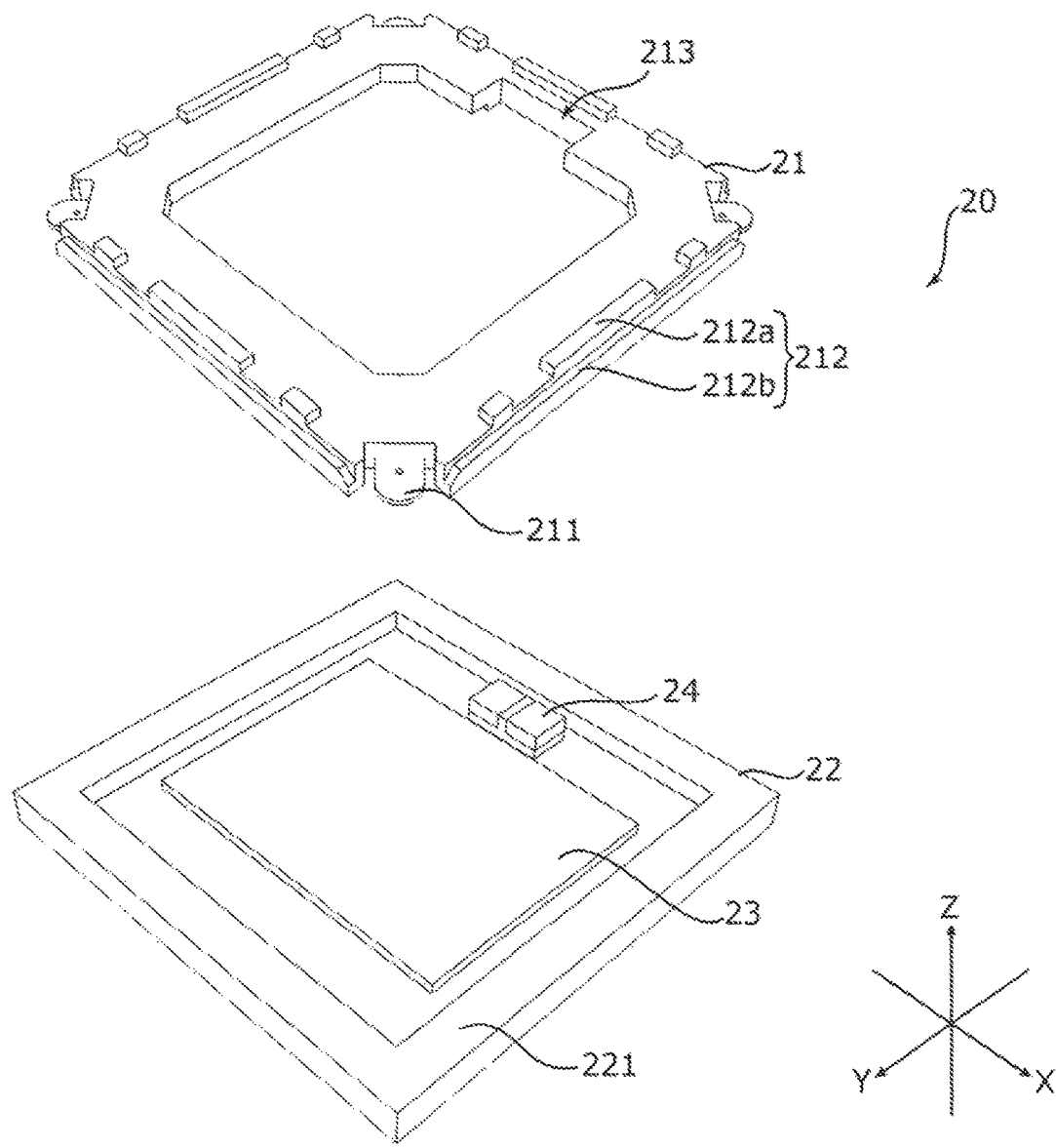
FIG. 6 is an exploded perspective view of a base part.

In the present embodiment, lens holder fixing part 141a functions as a reflection plate that reflects light emitted from reflection-type photo reflector 24 (see FIG. 6). Since lower leaf spring 141 is composed of a metal material, a part of lower leaf spring 141 can be utilized as a reflection plate. With this configuration, it is not necessary to bond a reflection plate which is a member other than the components of AF movable part 11 to AF movable part 11, and accordingly, the component cost is not increased, and the assembly work is not complicated. In addition, since the weight of AF movable part 11 is not increased, favorable response sensitivity is ensured.

To obtain high reflection efficiency, it is preferable to form lower leaf spring 14 with stainless-steel. In addition, preferably, the bottom surface (the surface opposite to reflection-type photo reflector 24 (see FIG. 6)) of lens holder fixing part 141a that functions as a reflection plate is mirror finished by plating or the like. With this configuration, the reflection efficiency of lens holder fixing part 141a can be increased, and variation in reflectance due to oxidation and/or corrosion of the surface can be prevented. It is to be noted that a transparent tape and/or a transparent coating material may be applied to protect the surface as long as the reflection efficiency can be ensured.

Magnet holder fixing parts 141c and 141d have shapes corresponding to lower spring fixing part 121d of magnet holder 121. When the positioning bosses (not illustrated) of magnet holder 121 are fitted into fixing holes 141n of magnet holder fixing parts 141c and 141d, lower leaf spring 141 is positioned to magnet holder 121, and fixed by applying an adhesive agent to the positioning bosses or by thermally caulking the positioning bosses.

Arm parts 141e and 141f couple lens holder fixing part 141a and magnet holder fixing part 141c, and lens holder fixing part 141b and magnet holder fixing part 141d, respectively. Each of arm parts 141e and 141f has a zigzag shape, and is elastically deformed when AF movable part 11 moves.

At the time of assembling AF driving part 10, first, magnet part 122 is housed in magnet housing part 121e of magnet holder 121, and upper elastic supporting part 13 is attached to upper spring fixing part 121b. Next, lower leaf spring 14 is attached to lower spring fixing part 111g and 111h of lens holder 111, and in this state, lens holder 111 is fitted into magnet holder 121 from the imaging side in the light axis direction. Then, upper leaf springs 131 and 132 are attached to upper spring fixing parts 111e and 111f of lens holder 111. In addition, lower leaf spring 14 is attached to lower spring fixing part 121d of magnet holder 121.

Lens holder fixing parts 131a and 132a of upper leaf springs 131 and 132 are respectively bonded by soldering to end portions of AF coil part 112 tied to upper spring fixing parts 111e of lens holder 111, and are electrically connected thereto. In this manner, AF driving part 10 is assembled.

FIG. 6 is an exploded perspective view of base part 20. As illustrated in FIG. 6, base part 20 includes base member 21, image sensor substrate 22, imaging device 23, reflection-type photo reflector 24 and the like. Base part 20 is disposed on the imaging side in the light axis direction of AF driving part 10. Base part 20 is an image capturing part that captures a subject image imaged by a lens part (not illustrated).

In plan view, base member 21 has a square shape, and has quadrangular opening 21a at a center portion. In addition, base member 21 includes cutout part 213 at a position corresponding to reflection-type photo reflector 24.

By insert molding, terminal metal fitting 211 and the like are embedded in base member 21. One end of terminal metal fitting 211 is exposed at a corner of base member 21, and the other end (not illustrated) of terminal metal fitting 211 is exposed at a lower portion of base member 21. One end of terminal metal fitting 211 is connected with the other end (lower end) of suspension wire 30, and the other end of terminal metal fitting 211 is electrically connected with the power-source line (not illustrated) of image sensor substrate 22.

Base member 21 includes cover attaching portions 212 at peripheral portions. Cover attaching portion 212 includes protruding part 212a protruding upward from the reference surface (top surface) of base member 21, and step part 212b recessed downward from the reference surface. In the state where shield cover 2 is positioned by protruding part 212a, shield cover 2 is fitted into cover attaching portion 212, and bonded to step part 212b. A terminal metal fitting (not illustrated) is embedded in cover attaching portion 212, and through the terminal metal fitting, shield cover 2 is electrically connected with image sensor substrate 22, and grounded.

As with base member 21, image sensor substrate 22 is a substrate having a square shape in plan view. Image sensor substrate 22 includes frame part 221 protruding upward from the reference surface (the mounting surface of imaging device 23), and base member 21 is bonded to frame part 221. With frame part 221, a recess for mounting imaging device 23 and reflection-type photo reflector 24 is formed.

Imaging device 23 is mounted at an approximate center of image sensor substrate 22. Imaging device 23 is composed of, for example, a CCD (charge coupled device) image sensor, a CMOS (complementary metal oxide semiconductor) image sensor, or the like. Imaging device 23 captures a subject image imaged by a lens part (not illustrated).

Figure 7:
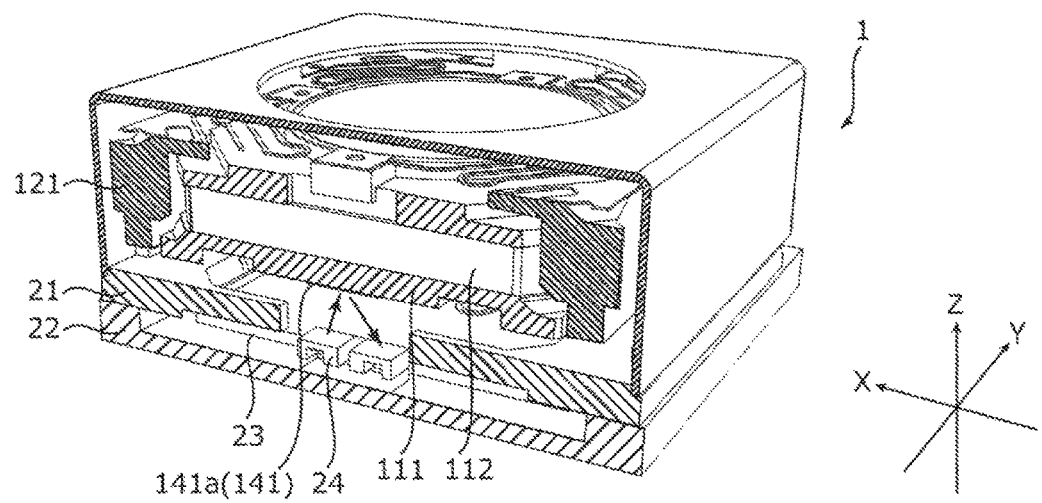
FIG. 7 is an upper perspective sectional view illustrating a positional relationship between a reflection-type photo reflector and a reflection plate.
Figure 8:
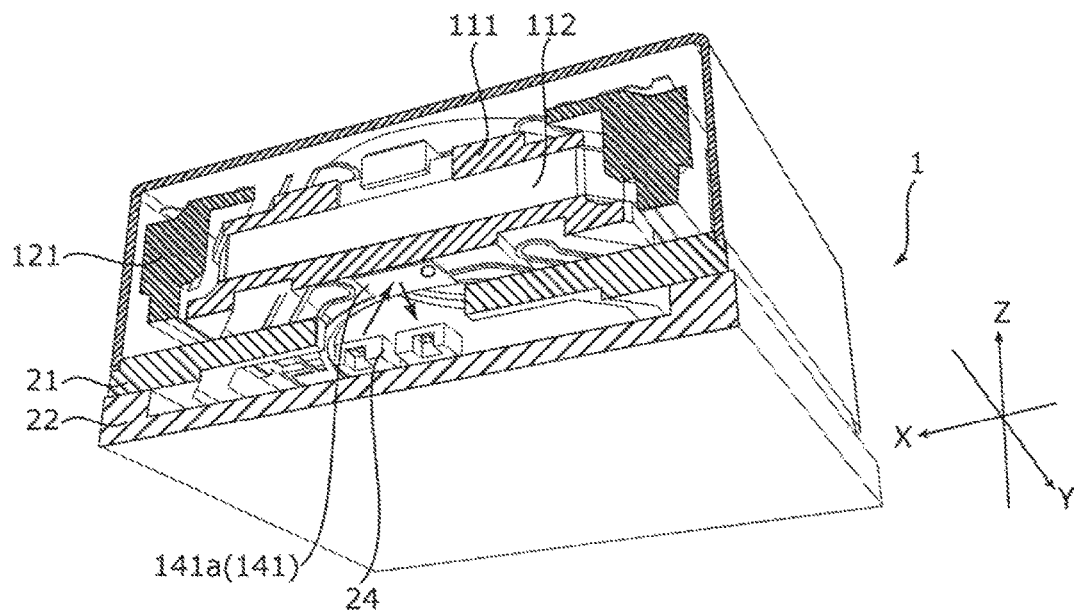
FIG. 8 is a lower perspective sectional view illustrating a positional relationship between the reflection-type photo reflector and the reflection plate.

In image sensor substrate 22, reflection-type photo reflector 24 is mounted at a position corresponding to lens holder fixing part 141a of lower leaf spring 14. Reflection-type photo reflector 24 is an optical sensor including a light emission part and a light reception part in one semiconductor package. As illustrated in FIG. 7 and FIG. 8, reflection-type photo reflector 24 is exposed to AF movable part 11 side through cutout part 213 of base member 21. Reflection-type photo reflector 24 emits an infrared ray toward the reflection plate (here, lens holder fixing part 141a of lower leaf spring 14) of AF movable part 11. Then, the position of AF movable part 11 is detected based on the intensity of reflection light which is reflected by the reflection plate and incident on the light reception part.

Normally, when the position in the light axis direction of AF movable part 11 is detected by utilizing the reflection-type photo reflector, it is necessary to mount a reflection-type photo reflector separately from AF movable part 11 in the light axis direction, and install a reflection plate (for example, aluminum mirror) in AF movable part 11. In the present embodiment, a part of a member that is displaced together with AF movable part 11, which is lens holder fixing part 141a of lower leaf spring 14 in this case, is utilized as a reflection plate as a reflection-type photo reflector, and it is therefore not necessary to dispose an additional component.

At the time of assembling lens driving device 1, first, one ends of suspension wires 30 are inserted to respective wire connecting parts 131i of upper leaf spring 131 of AF driving part 10, and fixed by soldering. Next, the other ends (lower ends) of suspension wires 30 are inserted to terminal metal fittings 211 of base member 21, and fixed by soldering. Power feeding to AF coil part 112 is performed through suspension wire 30 and upper elastic supporting part 13.

A damper is disposed in a gap between wire connecting part 131i of upper elastic supporting part 13 and arc groove part 121a of magnet holder 121 so as to surround suspension wire 30. Thus the damper is interposed between magnet holder 121 and upper elastic supporting part 13. By interposing the damper (not illustrated) between magnet holder 121 and upper elastic supporting part 13, generation of unnecessary resonance (high-order resonance mode) can be reduced, and consequently, the stability of the operation can be ensured. The damper can be readily applied by use of a dispenser. In addition, ultraviolet curing silicone gel can be adopted as the damper, for example.

At the time of automatic focusing in lens driving device 1, AF coil part 112 is energized. When AF coil part 112 is energized, a Lorentz force is generated at AF coil part 112 by interaction between the magnetic field of magnet part 122 and the current flowing through AF coil part 112. The direction of the Lorentz force is a direction (the Z direction) orthogonal to the direction of the magnetic field (X direction or Y direction) and to the direction of the current flowing through the AF coil part 112 (the Y direction or the X direction). Since magnet part 122 is fixed, a reactive force acts on AF coil part 112. With this reactive force serving as the driving force of the AF voice coil motor, AF movable part 11 including AF coil part 112 moves in the light axis direction, and thus focusing is performed.

Further, in lens driving device 1, a closed loop control is performed based on a detection signal of reflection-type photo reflector 24 (position detection part). With the closed loop control method, the hysteresis characteristics of the voice coil motor are not required to be considered, and the stability of the position of AF movable part 11 can be directly detected. Furthermore, automatic focusing of an image surface detection method can be adopted. Accordingly, with high responsiveness, speedup of the automatic focusing operation can be achieved.

As described above, lens driving device 1 includes AF coil part 112 disposed at a periphery of a lens part (not illustrated), and magnet part 122 (AF magnet part) disposed separately from AF coil part 112 in a radial direction, and performs automatic focusing by moving, with respect to AF fixing part 12 including one of AF coil part 112 and magnet part 122, AF movable part 11 including the other of AF coil part 112 and magnet part 122 in a light axis direction by use of a driving force of a voice coil motor composed of AF coil part 112 and magnet part 122. In addition, lens driving device 1 includes reflection-type photo reflector 24 (position detection part) disposed separately from AF movable part 11 on an imaging side in the light axis direction, reflection-type photo reflector 24 being configured to emit light toward AF movable part 11 and receive light reflected by AF movable part 11 to detect a position of AF movable part 11 in the light axis direction based on an intensity of received light. Lens holder fixing part 141a (displaced together with AF movable part 11 member part of) of lower leaf spring 14 functions as a reflection plate that reflects light emitted from reflection-type photo reflector 24.

In lens driving device 1, a part of lower leaf spring 14 which is displaced together with AF movable part 11 is utilized as a reflection plate, and thus reflection-type photo reflector 24 can be mounted without increasing the component cost or complicating the assembly work. Accordingly, lens driving device 1 is very useful for the case where automatic focusing is performed with a closed loop control system by utilizing reflection-type photo reflector 24.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, a given portion (a portion corresponding to reflection-type photo reflector 24) of lens holder 111 may function as a reflection plate. In this case, to obtain favorable reflection efficiency, it is preferable that at least a given portion of lens holder 111 be formed with a white (natural color) resin material. While lens holder 111 is normally formed with a black resin material, it is also possible that only a given portion is formed with a white resin material by two-color molding (double molding).

In addition, for example, AF driving part 10 of lens driving device 1 may be of a moving magnet type in which the AF magnet part is disposed in AF movable part 11, and the AF coil part is disposed in AF fixing part 12.

The present invention is also applicable to a lens driving device having, as well as an AF function, a shake-correcting function (so-called OIS (Optical Image Stabilization) function) of reducing irregularities of image by optically correcting hand shake (vibration) upon capturing an image is caused.

While a smartphone serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, such as a camera-equipped mobile phone, a note-type personal computer, a tablet terminal, a mobile game machine, a webcamera, and a camera-equipped in-vehicle apparatus (for example, a rear-view monitor apparatus or a drive recorder apparatus). In addition, the camera mounting device serving as a transport apparatus is a transport apparatus including a camera module and a control section that processes an image obtained with the camera module, such as an automobile.

Figure 9A:
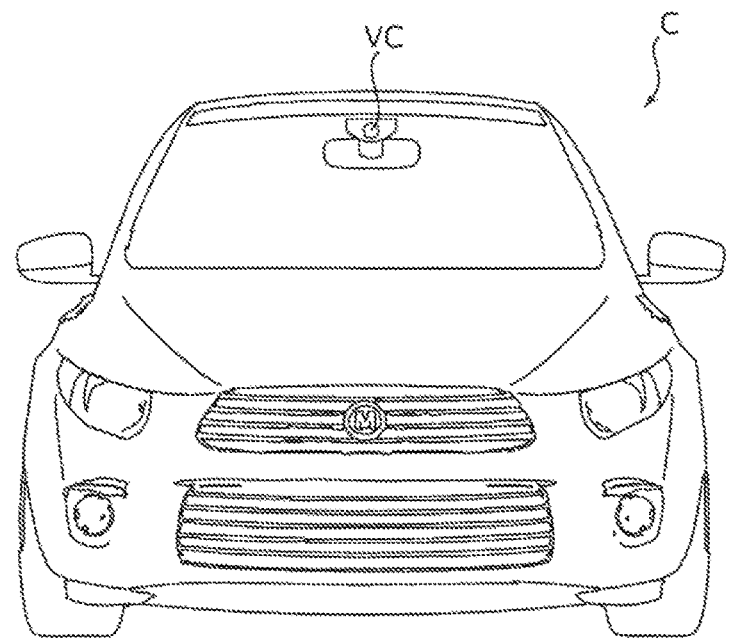
FIGS. 9A and 9B illustrate an automobile in which a camera module is mounted.
Figure 9B:
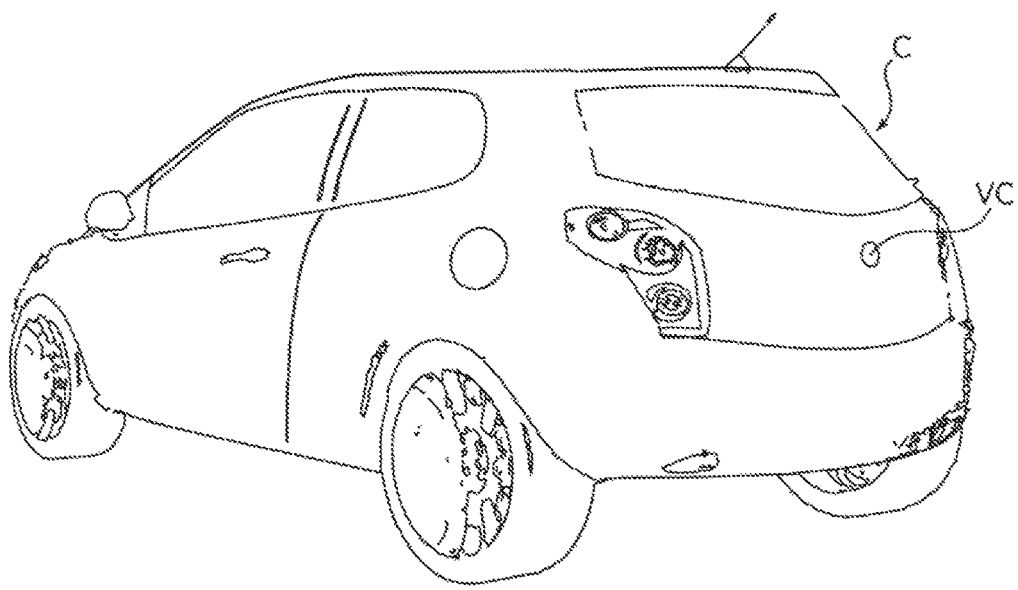

FIGS. 9A and 9B illustrate automobile C serving as a camera mounting device in which camera module VC (Vehicle Camera) is mounted. FIG. 9A is a front view of automobile C, and FIG. 9B is a rear perspective view of automobile C. In automobile C, camera module A described in the embodiment is mounted as in-vehicle camera module VC. As illustrated in FIGS. 9A and 9B, in-vehicle camera module VC is attached to the windshield so as to face the front side, or attached to the rear gate so as to face the rear side, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

This application is entitled to and claims the benefit of Japanese Patent Application No. 2014-265983 dated Dec. 26, 2014, the disclosure of which including the specification, drawings and abstract is incorporated herein by reference in its entirety.

REFERENCE SIGNS LIST

1 Lens driving device
2 Shield cover
10 AF driving part
11 AF movable part
111 Lens holder
112 AF coil part
12 AF fixing part
121 Magnet holder
122 Magnet part
122A to 122D Permanent magnet
13 Upper elastic supporting part
131, 132 Upper leaf spring
14 Lower elastic supporting part
141, 142 Lower leaf spring
141a Lens holder fixing part (reflection plate)
20 Base part (image capturing part)
21 Base member
22 Image sensor substrate
23 Imaging device
24 Reflection-type photo reflector (position detection part)
30 Supporting member
M Smartphone (camera mounting device)
A Camera module

The invention claimed is:

1. A lens driving device comprising:
a lens driving device including an auto-focusing coil part disposed at a periphery of a lens part, and an auto-focusing magnet part disposed separately from the auto-focusing coil part in a radial direction, the lens driving device being configured to perform automatic focusing by moving, with respect to an auto focus fixing part including one of the auto-focusing coil part and the auto-focusing magnet part, an auto focus movable part including the other of the auto-focusing coil part and the auto-focusing magnet part in a light axis direction by use of a driving force of a voice coil motor composed of the auto-focusing coil part and the auto-focusing magnet part;
a position detection part disposed separately from the auto focus movable part on an imaging side in the light axis direction, the position detection part being configured to emit light toward the auto focus movable part and receive light reflected by the auto focus movable part to detect a position of the auto focus movable part in the light axis direction based on an intensity of received light; and
a lower elastic supporting part disposed at a bottom surface of the auto focus movable part, the lower elastic supporting part being configured to elastically support the auto focus movable part with respect to the auto focus fixing part, wherein:
the lower elastic supporting part is made of a single element and includes a fixing portion which is fixed to the auto focus movable part and which is displaced together with the auto focus movable part; and
the fixing portion functions as a reflection plate configured to reflect light emitted from the position detection part.

2. The lens driving device according to claim 1, wherein the lower elastic supporting part is composed of a stainless-steel material.

3. The lens driving device according to claim 1, wherein the fixing portion is mirror finished.

4. The lens driving device according to claim 3, wherein the fixing portion is plated.

5. A camera module comprising:
the lens driving device according to claim 1;
a lens part mounted to the auto focus movable part; and
an image capturing part configured to capture a subject image imaged with the lens part.

6. A camera mounting device that is an information apparatus or a transport apparatus, the camera mounting device comprising the camera module according to claim 5.

* * * * *